(12) United States Patent
Darby et al.

(10) Patent No.: US 7,215,698 B2
(45) Date of Patent: May 8, 2007

(54) POSITION FIXING SYSTEM

(75) Inventors: Barry James Darby, Reading (GB); Pierre Diederich, Purley (GB); Ewan Lindsay Frazer, Hampshire (GB)

(73) Assignee: Thales Research & Technology Ltd., Reading (GB)

( * ) Notice: Subject to any disclaimer, the term of this patent is extended or adjusted under 35 U.S.C. 154(b) by 840 days.

(21) Appl. No.: 10/234,178

(22) Filed: Sep. 5, 2002

(65) Prior Publication Data
US 2003/0058924 A1    Mar. 27, 2003

(30) Foreign Application Priority Data
Sep. 5, 2001  (GB) ................................ 0121491.5

(51) Int. Cl.
*H04B 1/00* (2006.01)
(52) U.S. Cl. ..................................... 375/135; 132/260
(58) Field of Classification Search ................ 375/132, 375/135, 136, 130, 260, 285, 272
See application file for complete search history.

(56) References Cited

U.S. PATENT DOCUMENTS

| 5,008,899 | A |   | 4/1991  | Yamamoto |
| 5,500,871 | A |   | 3/1996  | Kato et al. |
| 5,546,422 | A |   | 8/1996  | Yokev et al. |
| 6,064,695 | A | * | 5/2000  | Raphaeli ..................... 375/230 |
| 6,148,020 | A |   | 11/2000 | Emi |
| 6,215,810 | B1 |  | 4/2001  | Park |
| 6,240,282 | B1 | * | 5/2001  | Kleider et al. ........... 455/226.1 |
| 6,466,607 | B1 | * | 10/2002 | Chauncey et al. .......... 375/131 |
| 6,591,084 | B1 | * | 7/2003  | Chuprun et al. ........... 455/3.05 |
| 6,718,503 | B1 | * | 4/2004  | Lerner et al. ................ 714/755 |
| 6,990,093 | B1 | * | 1/2006  | Rantalainen et al. ....... 370/350 |

OTHER PUBLICATIONS

M. Masaaki, WPI Abstract, AN 1998-165872, JP 10-032524, 3 pages, "Wide-Spectrum Communication System—Involves Determining Hopping Timing Sequence of Frequency-Hopping Modulating Signal Based on Correlated Synchronous Timing Patterns of Wide-Spectrum Modulating Signal", Jul. 17, 1996.

N. Koichi, WPI Abstract, AN 1997-172164, JP 9-036795, 2 pages, "Spread Spectrum Communication Relay System for Wireless Communication—Has.Repeating Installation Whose Transmitter Carries out Retransmission of RF Signal Delayed by Delay Circuit" Jul. 20, 1995.

* cited by examiner

*Primary Examiner*—Dac Ha
*Assistant Examiner*—Jaison Joseph
(74) *Attorney, Agent, or Firm*—Oblon, Spivak, McClelland, Maier & Neustadt, P.C.

(57) ABSTRACT

In a first aspect the present invention provides a method of producing an ultra wide band signal in which a carrier signal is modulated by a spreading waveform which is a periodic deterministic wideband signal and the frequency of the carrier signal is changed by a predetermined amount at predetermined intervals (the reciprocal of this interval being the hopping rate), wherein there is a harmonic relationship between the carrier frequency, the predetermined amount of frequency change, and the period of the spreading waveform. In this way, an ultra wide band signal is created using both direct sequence and frequency hopping techniques and the signal so created may be detected using a coherent detector at a receiver. This provides a wide bandwidth signal, or even an ultra wide bandwidth (UWB) signal which mitigates the problems of multi-path signals (through coherent combining across a wide bandwidth) and also interference.

25 Claims, 5 Drawing Sheets

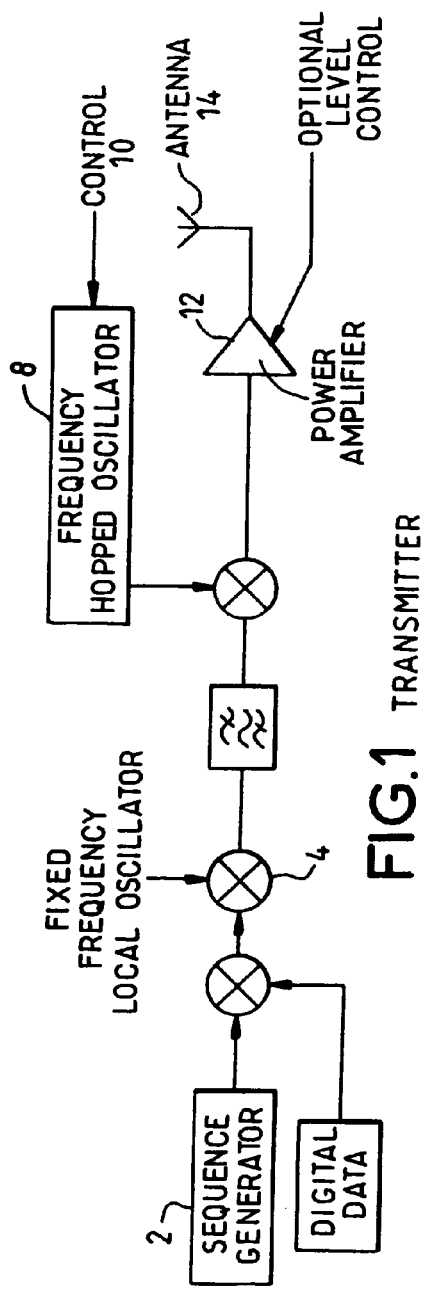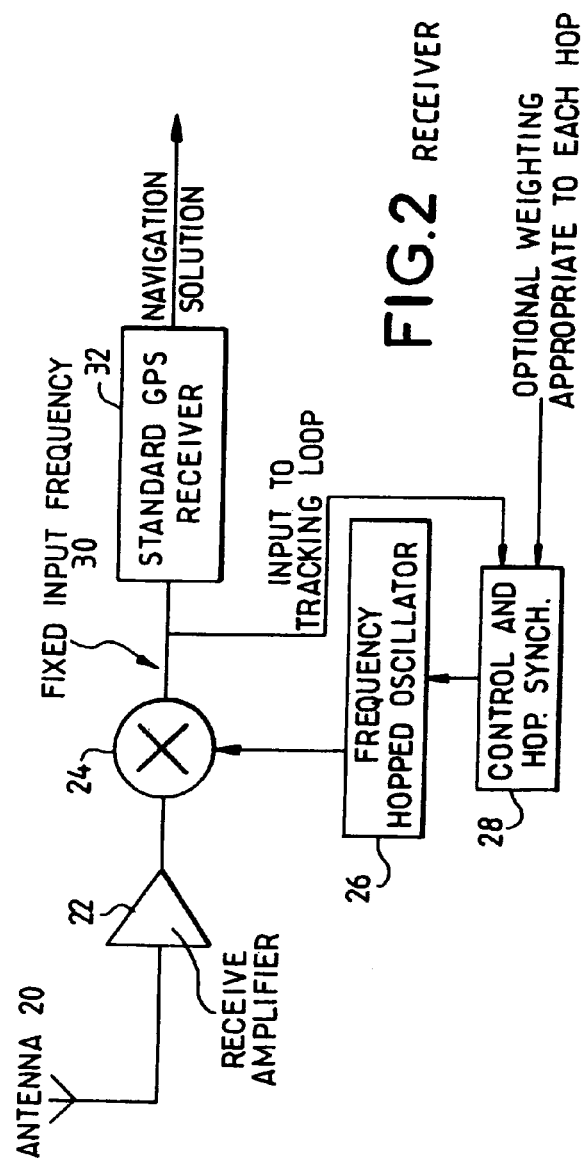

SPECTRUM OF HYBRID FREQUENCY HOPPING-DIRECT SEQUENCE
SPREAD SPECTRUM SIGNAL

SPECTRUM OF SIGNAL ADAPTED TO EXCLUDE THE USE OF FREQUENCIES
IN THE SAME BAND AS A STRONG INTERFERING SIGNAL

POSITION FIXING SYSTEM

BACKGROUND OF THE INVENTION

1. Field of the Invention

The present invention relates to any positioning system that uses synchronised signals from a number of reference stations. The position of the reference stations is accurately known.

2. Related Background Art

A mobile terminal receives signals from a number of reference stations, measures the difference in time of arrival between the signals and computes an estimate of its own position relative to the reference stations. In order to form an estimate in three-dimensional space a minimum of four reference station signals must be received.

A 'dual' arrangement is also well known where each mobile terminal transmits a signal to the reference stations that are mutually time synchronised as before. The reference stations are connected to a central control point where the position calculation is performed. The estimate of position is then transmitted to the mobile terminal. In order to form an estimate in three-dimensional space a minimum of four reference stations must receive the signal from the mobile terminal.

Factors influencing the accuracy of the position estimate, whichever arrangement is employed, are:

1. Geometry—the direct path to some reference stations may be obscured by natural or man-made objects and/or the mobile can be in a location where trigonometric calculations can give rise to large errors.
2. Multi-path—signals from the reference stations may be subject to reflection off an object (either stationary or moving) and these indirect or multi-path signals give rise to an error in the position estimate because they distort the reception of the direct signal.
3. Interference—man-made interference from other systems can block reception of the desired signal because they have much higher power levels or at lower levels of interference can cause errors in the mobile receiver signal processing.

The GPS system is the best known example of such a positioning system. In this case satellites carry the synchronised reference stations. One of the major deficiencies with GPS is that coverage in buildings and in dense urban environments is not reliable. The reason being the obscuration and attenuation of the direct path signals by buildings. Often in areas where signals may be received they are degraded by complex multi-path components.

This invention supplements GPS in these environments and can be used where GPS signals are available but greater precision is required e.g. in aircraft landing.

Spread-spectrum techniques have been developed to give improvements in a number of instances:

To enable unambiguous ranging estimates
To reduce degradation due to multi-path
To reduce susceptibility to interfering signals
To reduce detection by unauthorised users
To reduce interference to other systems Often, a number of these improvements can be obtained at the same time. In general, the performance of each of the above is determined directly by the bandwidth and coherence of the spread spectrum signal.

These techniques are in common use in navigation, communications and radar systems.

This invention describes a means of producing and receiving a controllable ultra-wideband (UWB) spread spectrum signal that has characteristics that are well matched to the application of precise positioning in environments where GPS is unreliable.

The nature of the signal also makes it suitable for the other named applications above.

There are two general methods of generating a spread spectrum signal. The first is by direct modulation of a carrier by a wideband signal and the second is by hopping the carrier frequency.

In the direct method, the carrier is directly modulated by a deterministic time-limited wideband waveform (spreading waveform). This spreading waveform is made to be periodic by repeating an exact replica after a suitable time interval (waveform period). For the resulting spread spectrum signal to be coherent, the carrier frequency and the waveform period must be harmonically related.

A common means is to use a pseudo random binary sequence (PRBS) as the spreading waveform. In this case to ensure coherence the carrier frequency and the clock (chipping) rate of the spreading waveform are in a harmonic relationship—this in turn ensures that the time period of the PRBS is harmonically related to the carrier frequency. Another means of producing a coherent spread spectrum signal is to modulate a carrier signal with a chirp waveform that is repeated at a rate that is harmonically related to the carrier frequency. To send messages, the spreading waveform is first modulated with the message signal. The resulting waveform then modulates a carrier.

In the PRBS example, the chipping rate and the code length of the PRBS signal must be high enough to spread the signal energy over the whole of the desired bandwidth. Each transmission has a unique spreading waveform by which it can be recognised and retrieved and accordingly a receiving station needs to be able to generate the same spreading waveform in synchronism with the transmission in order to recognise and recover the message.

A multiple access system can be devised by using unique spreading waveforms. All other transmissions, which are combined with different spreading waveforms, appear as noise in the receiver. If the direct modulation is by PRBS the system is termed code division multiple access (CDMA).

In the frequency hopping method, the frequency of the transmission is changed as a function of a predetermined PRBS. Frequency hopping is usually limited to relatively slow hopping rates (typically a few kilohertz) because of inherent limitations in the equipment used.

SUMMARY OF THE INVENTION

The present invention proposes a method of producing an ultra-wideband (UWB) signal to be produced without some of the limitations of the direct spread spectrum or frequency hopping methods. The present invention combines aspects of these two methods.

Accordingly in a first aspect the present invention provides a method of producing an ultra wideband signal in which (I) a carrier signal is modulated by a spreading waveform which is a periodic deterministic wideband signal and (II) the frequency of the carrier signal is changed by a predetermined amount at predetermined intervals (the reciprocal of this interval being the hopping rate), wherein there is a harmonic relationship between the carrier frequency, the predetermined amount of frequency change, and the period of the spreading waveform.

In this way, a coherent UWB signal is created using both direct spread spectrum and frequency hopping techniques and the UWB signal so created is detected using a coherent correlation detector at a receiver.

A UWB signal is one which has a fractional bandwidth greater than 20% (i.e. 20% of centre carrier frequency). The fractional bandwidth may be defined as $2(F_H-F_L)/(F_H+F_L)$, where $(F_H+F_L)/2$ is the nominal centre carrier frequency, and the majority of the energy lies between lower frequency $F_L$ and higher frequency $F_H$. In this case the energy density outside the $F_L$ to $F_H$ region is at least XdB below the largest energy density within the region, the energy density usually being measured in a 1 MHz bandwidth. XdB may be 3 dB, preferably 10 dB or even 20 dB. Normally for UWB this will be a bandwidth greater than 500 MHz, and typically between 500 MHz and 7.5 GHz.

Systems with a bandwidth of between 1 MHz and 500 MHz are usually considered to be Wideband, with narrowband systems having a bandwidth of less than 1 MHz, although some put the boundary at 100 kHz.

A deterministic signal is one in which the waveform is substantially or predominantly predictable at a receiver, for example one which does not carry any arbitrary data unknown apriori to the receiver. The deterministic waveform may contain a data pattern known, determined or passed by other means to the receiver. The signal may have deterministic aspects for the part of the waveform used by a receiver to provide position fixing information, i.e. a composite waveform with non-deterministic parts can carry data, whilst the deterministic parts carry the position signal. One part of a composite waveform can provide information to make another part or aspect deterministic, for example by carrying forward error correction redundancy. The deterministic waveform can be defined in terms of an explicit mathematical expression of at least one part of its aspects. An example of such an aspect would be the phase of the waveform; in this instance the amplitude need not be deterministic. For two specific embodiments of the present invention (utilising a PRBS signal or a chirp signal respectively) the properties of the deterministic signal to be specified are explained below.

Preferably the spreading waveform is deterministic across a plurality of frequencies which improves performance of the resolution of finely separated multipath interference. The wider the bandwidth of the plurality of frequencies, the closer the paths which can be separated. The harmonic relationship between the carrier frequency, the frequency change and the spreading waveform period enables information about the transmission channel to be derived by the techniques described.

Preferably the spreading waveform is a PRBS signal having a determined chipping rate; the code length divided by the chipping rate is the period of the spreading waveform. Alternatively, the spreading waveform may be a chirp signal having a predetermined modulation rate and duration wherein the period of the spreading waveform is the interval between chirps.

In a further aspect, the present invention provides a method of producing an ultra-wideband (UWB) signal in which (I) a carrier signal is modulated by a PRBS signal having a determined chipping rate and (II) the frequency of the carrier signal is changed by a predetermined amount at predetermined intervals (the reciprocal of this interval is the hopping rate) wherein there is a harmonic relationship between the carrier frequency, the predetermined amount of frequency change, and the chipping rate of the PRBS signal.

A chirp signal may be used in place of the PRBS signal, and so in a further aspect the present invention provides a method of producing an ultra-wideband signal in which (I) a carrier signal is modulated by a chirp signal having a predetermined modulation rate and duration and (II) the frequency of the carrier signal is changed by a predetermined amount at predetermined intervals (the reciprocal of this interval is the hopping rate) wherein there is a harmonic relationship between the carrier frequency, the predetermined amount of frequency change and the interval between chirps.

The hopping rate may also have a harmonic relationship to the carrier frequency.

By way of an example, the method could use a PRBS which is a Gold code having code length 1023 and a chipping rate of 1.023 MHz. The set of carrier frequencies used in hopping could be at multiples of 1.023 MHz and the frequency hopping rate could be 1 KHz i.e. the frequency is changed every milli second or multiples of 1 KHz. Thus, over the period of 1 second, a total sweep of 1.023 GHz, can be centered on a carrier of, say, 5 GHz. The acquisition of the PRBS code can readily be achieved with GPS-related hardware, and so preferably the code used can be a PRBS of an established or proposed satellite navigation system.

The formation of a correlation output by coherently summing the results from 1023 successive frequency hopped signals reinforces the desired signal, but tends to cancel or reduce the effect of multipath and interference. As will be appreciated, the signals from each discrete frequency hop are mutually coherent. The more components that can be summed, the better the accuracy.

Depending on the application the frequency hopping may be carried out in a pseudo-random manner or according to a linear progression. For example, the carrier frequency of each part of the signal may be selected according to a pseudo random algorithm. This improves signal-to-noise characteristics and also, from the point of view of an unauthorised receiver or victim receiver (from the point of view of interference), carrier frequency selection appears random. Over time, the whole available system bandwidth may be used.

It is also possible for the selection of the carrier frequency (whether done by a pseudo random process or otherwise) to be carried out so as to avoid the use of one or more frequencies or bands of frequencies within the selected bandwidth. This might be done, for example, where it is known that certain portions of the overall bandwidth should be avoided e.g. because it is known that a strong interfering signal might be present or perhaps another service might be compromised (e.g. cellular phones/radar navigation systems, etc.)

In some embodiments, the UWB signal produced by the method of the present invention may be transmitted discontinuously i.e. on a duty cycle. For example, in a given period of time, the UWB signal may be transmitted for only a portion of that time period (e.g. on for one, off for fifteen etc.). The power of the transmitted signal may be increased during the on portions of the duty cycle with respect to the power which would otherwise be employed if the signal were to be transmitted continuously. Such an arrangement also permits time division multiplexing to be easily arranged for multiple transmitters.

In addition, the present invention allows a UWB signal to be created which requires a flatter spectrum than can be achieved with a normal UWB signal. A typical UWB signal requires at least a 10 dB allowance at peak to mean across the spectrum, which reduces the power budget for that signal by the same amount. With the present invention, a small headroom (e.g. 2 dB) should suffice, which in turn permits up to a 50% range increase.

In preferred embodiments, the spectral shape of the PRBS signal need not follow the usual shape given by the formula [(sin x)/x]exp 2. Various methods for modifying the spectral shape of a PRBS signal are known, for example European Patent EP0131458 discloses a digital method which converts the response of a PRBS into a more rectangular shape using only elementary digital filtering. This technique could be used to configure the set of frequency hops so that any particular frequency segment is avoided, thus avoiding interference to/from a third party as described above.

Additionally and/or alternatively, in the method of the present invention, power control could be applied to each individual frequency hop in order to control the signal-to-noise ratio of each hop e.g. to achieve the minimum signal-to-noise ratio necessary.

Similarly, the received signal can be scaled or weighted as a function of the frequency on which it is received in order to improve the accuracy of the time or positional information derived from it. The scaling or weighting function applied may be adapted to improve the accuracy according to the environment experienced by the information passed from the transmitter and receiver. Often the scaling or weighting function will take the form of a "window" [for example, as described in "On the use of Windows for Harmonic Analysis with discrete Fourier Transform", Frederic J. Harris, Proc IEEE, Vol 66, No. 1, January 1978, pp 51–83]. The function may also include low value coefficients for frequency bands where there is perceived to be interference.

Additionally or alternatively, the signal received in a frequency bandwidth can be replaced using information derived from information received on any or all of the other frequencies, with the intention that this derived information would be a better replica of the transmitted information in that bandwidth, when that information had been lost, corrupted or otherwise modified by the environment experienced by the information passed from the transmitter to the receiver.

In a further aspect the present invention provides an apparatus for producing an ultra-wideband signal including (I) modulating means for modulating a carrier signal by a spreading waveform which is a periodic deterministic wideband signal and (II) means for changing the frequency of the carrier signal by a predetermined amount at predetermined intervals (the reciprocal of which is the hopping rate), wherein there is a harmonic relationship between the carrier frequency, the predetermined amount of frequency change, and the period of the spreading waveform.

Preferably the spreading waveform is a chirp signal having a predetermined modulation rate and duration wherein the period of the spreading waveform is the interval between chirps or means for carrying out the frequency hopping in a pseudo-random manner.

Accordingly, in a further aspect, the present invention provides an apparatus for producing an ultra-wideband signal including (I) modulating means for modulating a carrier signal by a PRBS signal having a determined chipping rate or a chirp signal and (II) means for changing the frequency of the carrier signal by a predetermined amount at predetermined intervals, wherein there is a harmonic relationship between the carrier frequency, the predetermined amount of frequency change, and the chipping rate of the PRBS signal or the interval between chirps.

In a preferred embodiment, the apparatus includes means for carrying out the frequency hopping in a pseudo-random manner or in any other deterministic pattern.

Preferably the means for changing the frequency of the carrier signal is operable to be carried out so as to avoid the use of one or more frequencies or bands of frequencies within the selected bandwidth.

The apparatus could be part of a transmitter which may be part of a satellite in a satellite navigation system.

In a further aspect, the present invention provides an apparatus for receiving a signal including (I) means for demodulating a carrier signal modulated by a spreading waveform which is a periodic deterministic wideband signal and (II) means for detecting the frequency of the carrier which changes by predetermined amounts at predetermined intervals (the reciprocal of which is the hopping rate), and means for changing the carrier frequency to predetermined values.

In a further aspect, the present invention provides apparatus for receiving an ultra-wideband including (I) means for demodulating a carrier signal modulated by a PRBS signal or a chirp signal and (II) means for detecting the frequency of the carrier which changes signal by a predetermined amount at predetermined intervals, and means for changing the carrier frequency to predetermined values.

Preferably any receiver is part of or connectable to a satellite navigation signal system receiver.

BRIEF DESCRIPTION OF THE DRAWINGS

Embodiments of the present invention will now be described by way of example with reference to the accompanying drawings in which:

FIG. 1 is a schematic diagram of a transmitter according to an aspect of the present invention.

FIG. 2 is a schematic diagram of a receiver according to an embodiment of the present invention.

DETAILED DESCRIPTION

Figure 5:
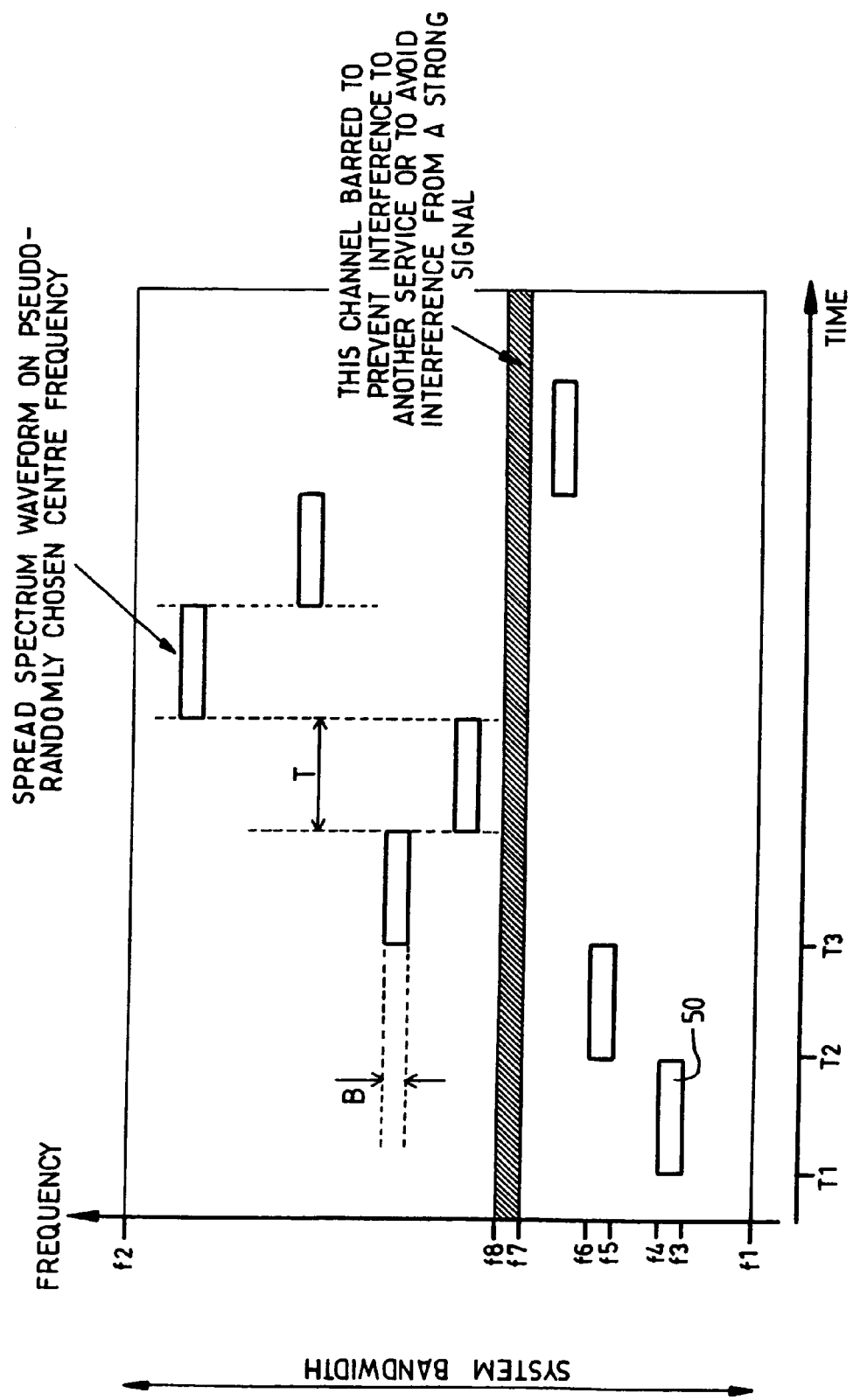
FIG. 5 is a schematic diagram showing the frequency hopping used to produce an example of a signal according to the present invention.

In FIG. 1, a sequence generator 2 is used to generate a PRBS signal, this is modulo—2 added to a data stream and the composite signal then modulates a carrier signal from a local oscillator at mixer 4. Following this, the carrier frequency of the signal is determined by the frequency hopped oscillator 8 under control 10. In one example, control 10 controls the frequency hop oscillator 8 in a pseudo random fashion so as to produce a signal, part of which is shown in FIG. 5. The resulting CDMA signal is then transmitted using a standard power amplifier 12 and antenna 14.

In a preferred embodiment, frequency correction may be applied to one or more of the frequency reference signals e.g. the fixed frequency local oscillator feeding mixer 4 and/or the reference frequency used in frequency hopped oscillator 8. A suitable calibration process may use round trip timings between three or more units in order to calibrate filtered delay. Preferably, the two frequency reference sources in this embodiment (the fixed frequency local oscillator feeding mixer 4 and the frequency reference in frequency hopped oscillator 8) are phase locked i.e. they are really one reference in terms of frequency drift. However, this is just one example of how this could be achieved. Alternatively, the fixed frequency local oscillator and mixer 4 could be omitted and direct synthesis used instead.

FIG. 2 shows a receiver according to an aspect of the present invention. The CDMA signal according to the present invention is received using a standard antenna 20 and low noise amplifier 22. The received signal will be a frequency hopped signal and the frequency hopping aspect is effectively removed using demodulator 24. Demodulator 24 uses a frequency hopped oscillator 26 under control of a synchronisation unit 28 which is operating in accordance with the same algorithm used to produce the frequency hopping in the transmitter.

In this way, the signal produced at an input terminal 30 of a GPS receiver 32 is effectively a standard CDMA signal as if it had been produced by the direct sequence method only and having a single fixed carrier frequency. The GPS receiver 32 is then able to decode the signal using the same PRBS code which was used to produce the signal, in the known decoding manner.

In a more general embodiment the GPS receiver can be replaced by a processor allowing weighting to be applied to different frequencies.

Preferably the receiver includes means for resilient recovery of frequency error without the need for additional parallel hardware; this improves the operational range of the equipment. The means includes processing means for processing the input signal in accordance with an algorithm which operates as follows:

Firstly, the integrated complex number vectors for each frequency which make up the input terms of the Fourier Transform is determined. Before each particular frequency, the complex number vectors for its use on one occasion and a subsequent occasion are determined and one is multiplied by the complex conjugate of the other—the result gives the phase change over the time interval between the visits to that particular frequency. The same may then be done for other frequencies used in the frequency hop system. In some embodiments, the phase changes may be scaled to correct for any differences in the respective time intervals. If all the time intervals are equal (e.g. because the same repeating hop sequence is used to visit all frequencies in the chosen set) then no correction is required. The set of (possibly corrected) vectors may then be put through a windowed Fourier Transform using one or more window functions. The peak term in the Fourier Transform output represents a frequency area in the transmission, including any Doppler error produced as a result of movement. The input terms to the Fourier Transform may (instead of or as well as the above) be filtered in other ways, e.g. the phase locked loop, Kalman filter etc. in order to track the frequency error.

This method may provide several advantages as follows:— a. It has processing gain and hence copes with large levels of noise.
b. It is not degraded by (stationary) multipath, indeed it benefits from it.
c. It copes with large frequency offsets with no ambiguity. Cheap uncorrected crystals can be used without compromising range.
d. It does not require anymore high speed hardware to implement.
e. The algorithm works with any set of time spacings. Larger time spacings between visits to a frequency result in more accurate measurements of frequency error (but less range—it may need a coarse correction first). One would therefore start with adjacent visits for coarse correction, then track more finely using visits several visits apart. Coarse correction can be done by adjusting the frequency reference, or by multiplying the terms prior to the Fourier transform by a vector rotating (backwards) at the rate of coarse estimate. The transmit pattern can be continuous, or it can be pulsed, provided at least two visit cycles complete adjacent to one another for the first coarse estimate. It is well suited to time division multiplexing.
f. The benefit is primarily of use to positioning, and low rate data systems, and not to high rate data systems.
g. A side effect of the Fourier transform is a segment of the impulse response of the channel is also established (about 30 meters is typical). Pulse systems would have to have hundreds of Rake taps to do the same (which would be very current consuming), or would have to scan the channel sequentially (which either reduces the update rate, or reduces the integration period and hence the range). It should be possible to track movement at rates about 100× faster compared to pulse UWB at the same range.

Figure 3:
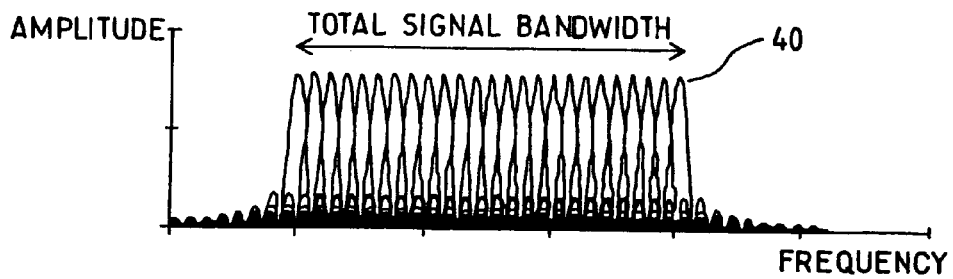
FIG. 3 is a graph showing an example of a spectrum of a wide band signal created according to the present invention.

FIG. 3 shows a graph of frequency against amplitude for an example of a CDMA signal produced in accordance with the present invention. The signal is referred to as a hybrid frequency hopping/direct sequence spread spectrum signal. As can be seen, the spectrum of the signal consists of a plurality of individual signal peaks (one of which is labelled 40). Each peak 40 is centred around a different carrier frequency and the plurality of peaks—which may overlap—combine to produce a hybrid signal covering the wide bandwidth shown. For example, a bandwidth of 1 GHz would allow positioning accuracies better than 0.2 m and multipath resolution of better than 0.5 m.

Figure 4:
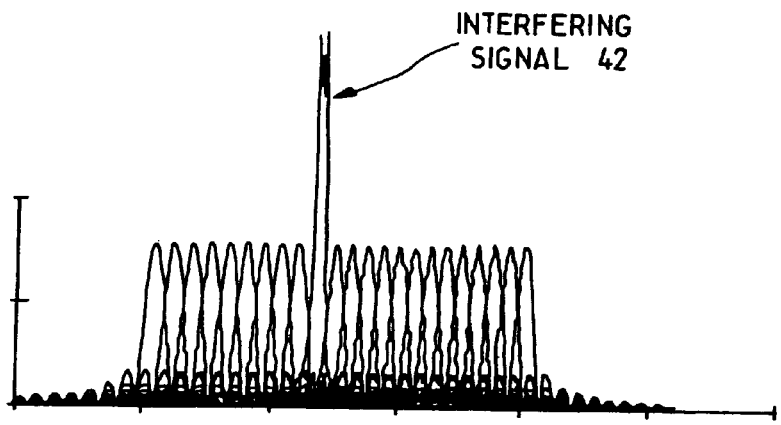
FIG. 4 is a graph showing the spectrum of the signal as shown in FIG. 3, modified to exclude frequencies associated with an interfering signal.

FIG. 4 is another graph of amplitude against frequency for an example of a signal according to the present invention. In this example, the frequency hopping has been modified so as to exclude a band of frequencies shown as 'x'. This band of frequencies corresponds with an expected interfering signal 42, so that the interfering signal does not interfere with the signal of the present invention, and vice versa.

FIG. 5 is a schematic graph of frequency against time for part of a signal in accordance with the present invention. As can be seen from FIG. 3, the aim of the invention in this example is to produce a signal having a bandwidth from frequency F1 to frequency F2. In FIG. 5, from time T1 to time T2 a 'burst' of signal 50 is produced which, by the PRBS method explained previously, produces a signal having a bandwidth from frequency F3 to frequency F4. At time T2, the carrier frequency has changed and from time T2 to T3 a further burst of signal 52 is produced, again by the PRBS method, having a bandwidth from frequency F5 to frequency F6.

As can be seen from FIG. 5, this procedure continues and effectively discrete bursts of signal are produced covering a different part of the system bandwidth which, when added together, may cover all, substantially all or part of the system bandwidth. As explained previously, part of the system bandwidth may remain deliberately unused and in this example that is from frequency F7 to frequency F8.

The bandwidth can usefully range from 1 MHz (1.023 MHz is convenient for GPS) through say 10.23 MHz (military GPS chipping rate) to say 100 MHz (here the acquisition problem is paramount) A good example would be in the range 10–20 MHz. Acquisition times are governed by bandwidth, sequence period and carrier frequency offset.

Frequency hopping may or may not take place in a linear fashion. In FIG. 5 hopping is arranged in a pseudo random manner so that each signal burst occupies an apparently unrelated part of the system bandwidth to the previous burst.

In summary, FIG. 5 shows in diagrammatic form the transmitted waveform for this Ultra-wideband scheme. It is essentially a hybrid of two methods of spread-spectrum namely frequency hopping (FH) and, for example, direct sequence (PRBS) spread-spectrum (DSSS). The available system bandwidth is regarded as being sub-divided into a number (N) of contiguous channels each of bandwidth B. The direct sequence signal (spreading waveform) occupies a notional bandwidth B and has a period T (T may be the duration of one or more code cycles). Successive pulses of the DSSS signal are transmitted on carrier frequencies determined by an algorithm known by both transmitter and receiver, the receiver performs a process known as acquisition to enable signal reception. From the point of view of an unauthorised receiver, carrier frequency selection appears random. Over time, the whole available system bandwidth may be used. By correctly combining all of the signals at the receiver it is possible to gain the benefit of the very wide spread in bandwidth N X B (or less if overlapped) to discriminate against multi-path signals. In some embodiments there will an advantage in combining only some of the signals and accepting a reduced bandwidth, for example if some signals are affected by noise or interference. FIG. 5 also shows a channel (it could be more than one, either in adjacent slots or in a number of non-adjacent slots) that is (are) not available for use in order to prevent of avoid interference.

In order to take advantage of the processing gain enabled by the ultra wide bandwidth, the frequency hopping is preferably phase coherent (constant phase different is maintained between transmitter and receiver as hopping progresses). This is achieved by generating carrier frequencies that are harmonic multiples of a fundamental frequency.

This invention may use the established signal structures used by GPS (and in future could be based on any such standard e.g. as being developed for GALILEO) that ensures that channels are spaced by that value (1.023 MHz). This in principle enables standard GPS correlation receivers to be used.

Figure 6:
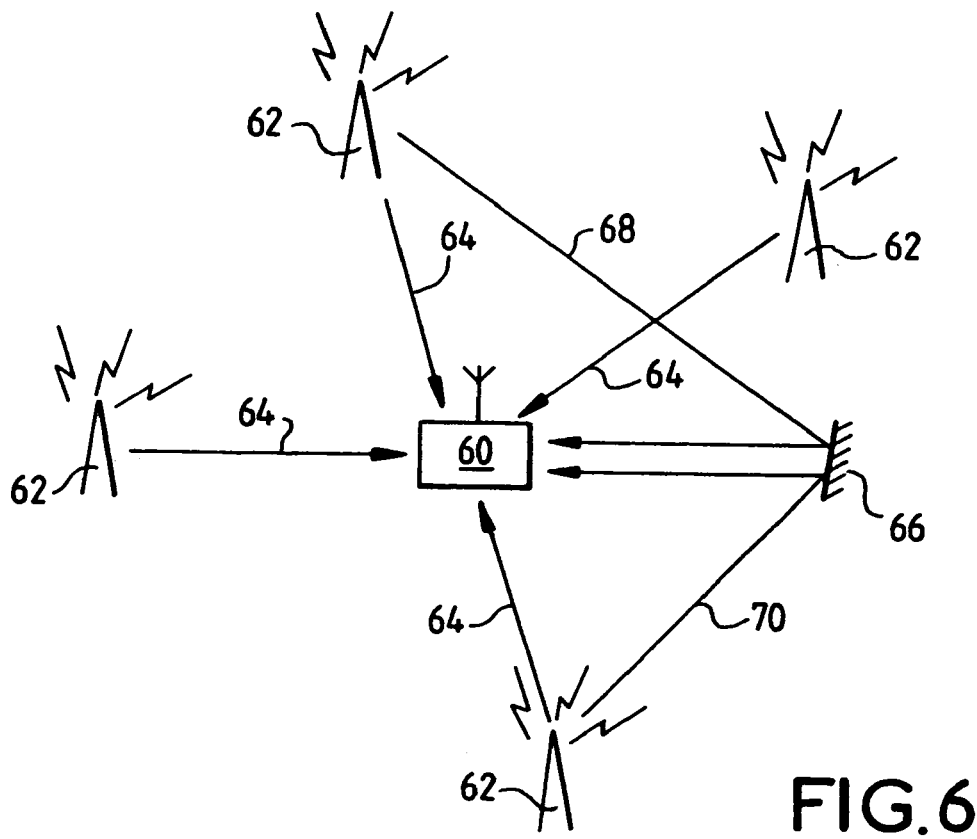
FIG. 6 is a schematic diagram showing a situation in which the present invention could be used.

In FIG. 6, a receiver 60 is shown which can receive signals from four reference transmitters 62. The reference transmitters have known locations and are time synchronised. The receiver 60 can receive direct path transmissions from the transmitter 62 and one example is shown as path 64. However the receiver 60 may also receive indirect path transmissions, such as reflected transmissions from a reflecting object 66. Two examples of indirect path transmissions are shown as 68, 70.

The reception of the indirect path transmissions produces a multipath echo and since these indirect path transmissions are slightly delayed this potentially shifts the position estimate for the receiver. The ultra wide band signals used by the present invention helps to allow the receiver to detect smaller time differences, thereby reducing the position errors due to the multipath nature of the transmissions.

Figure 7:
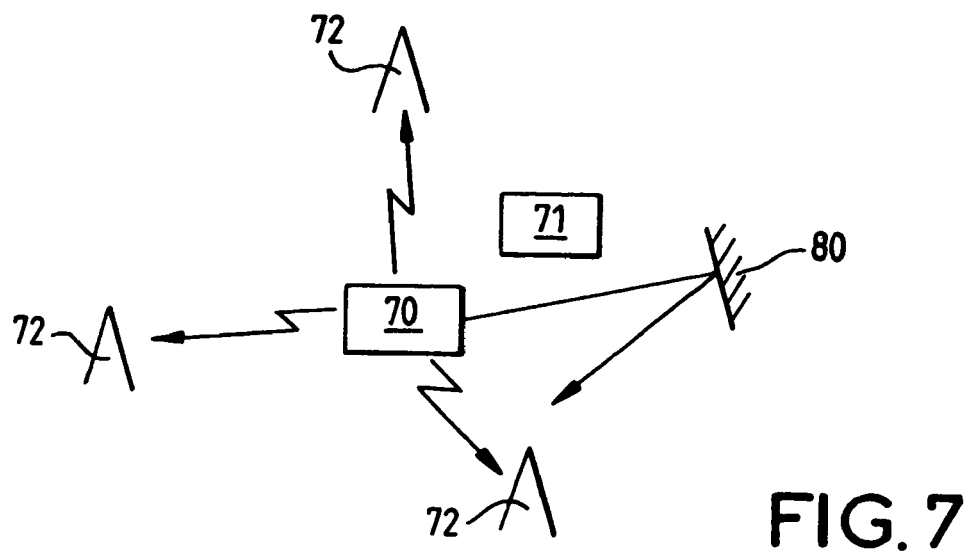
FIG. 7 shows the dual of the arrangement described in FIG. 6.

FIG. 7 depicts a dual of the arrangement described by FIG. 6. Receivers at the fixed reference station 72 pick up the transmission of one (or more) mobile station 70, 71. As in FIG. 6, the reference stations are accurately synchronised and the position of the mobile station can be calculated from the time differences of the signals observed at the reference stations. For a position in n dimensions, as in FIG. 6, at least (n+1) fixed stations are required. The received signals may be direct 74 or multipath 80.

Figure 8:
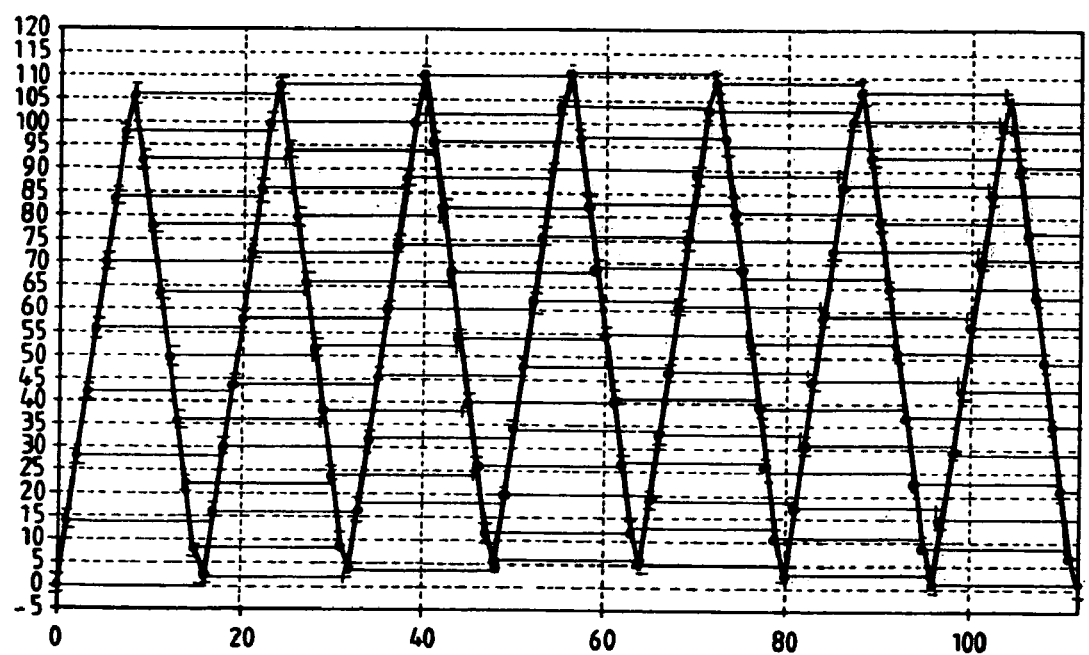
FIG. 8 shows one example of a frequency hopping sequence for use with the present invention.

FIG. 8 shows one example of a frequency hopping sequence used with the present invention. It has the following features:— a. Each frequency is visited once.
b. The synthesiser doesn't have to change far in frequency from one hop to the next. This makes fast hopping easier.
c. The arrangement allows for multiple transmitters which "follow" each other. I.e. when one transmitter finishes on a frequency, the next one then uses that frequency. This provides a time-division/frequency division multiplexing scheme.
d. The multiplex scheme is arranged so that multiple transmitters are spaced apart in frequency to avoid interference and near-far issues.
e. The scheme is represented by equations, allowing control of frequency spacing, number of transmitter slots, and total number of frequencies (2 of these 3) to be controlled.

The following is an example set of equations to derive a suitable frequency hopped sequence.

Let W be the number of cycles (e.g. 8); determines the number of frequencies and channels. W is even when Z=1.

Let S be the frequency step (e.g. 7), e.g. for near far spacing.

S*R is the number of frequencies (when Z=1)
W*2 is the number of channels.
Let R=INT(S/2)+1
Let Y=−1 typically, the stagger.
Let Z=0 or 1 (frequency spacing doubler)
Let X=IF(Z,0.5,0)
Let A be 0 . . . S*R−1, as increasing time (x axis)

$B = INT(A/W)$ $C = B\% (S*2)$ $D = C\% 2$ $E = D*R$ $F = INT((C\% (S*2))/S)$ $G = F*S$ $H = INT(C/2)$ $I = G - H + 2(1-F)*H - F + D*F*Y$ $J = I + E$ $K = A\% W$ $L = INT(A/W) \% 2$ $M = L*S*(W-1)$ $N = M - K*S + 2(1-L)*K*S$ $P = J + N + IF((A\% (W*S*2)) >= (W*S), X, 0) * IF(Z, 2, 1)$

P is the frequency number.
IF(A,B,C) means if A is true (non zero), then B else C.
INT(X) means the integer part of X.
% is the modulus operator.
A–Z are variables.

A family of sequences are found by adjusting integers W, S and by setting Z as 0 or 1. Y may also be adjusted.

Additionally or alternatively, a system can be formed where a mobile station is not required in the embodiment, but in which the reference stations monitor their own and/or each others transmissions for changes to the multipath signal. The range or pseudorange at which these signals are seen can be determined by the same method as if they were received by a mobile station apparatus. By triangulation of the ranges or pseudoranges seen it is possible to determine the position and/or movement of one or more unequipped mobile targets within the range of the reference stations. Where each reference station monitors its own signal, it is referred to as a monostatic radar.

A tag system is also possible with a single transmitter and receiver, or a transponder pair. Where each reference station monitors another reference station it is a bistatic radar. Where each reference stations monitor two or more reference stations (one of which could be its own signal), it is a multistatic radar. The reference stations may also monitor a reduced number of transmitted signals.

The method can also be extended to one or more mobile reference stations provided they calculate their relative positions. In each case, the range(s) or pseudorange(s) to the perturbation(s) in the multipath signal are known, and from these the position of one or more moving targets can readily be determined, and they can be tracked. A system designed to provide location information to an equipped mobile will necessarily also provide location information (2D or 3D) when used to locate unequipped mobiles. Applications for this technique include but are not limited to intrusion sensors and safety warning systems such as collision warnings. An alarm can be raised if one or more target(s) are present in particular areas or volumes.

Filtering can be applied by determining, for example, the speed or acceleration of the target using the received signals in order to reduce false alarms or predict collisions. The gain or sensitivity can also be adjusted according to range or degree of multipath, for example. Alarms may be suppressed where a mobile apparatus whose position has been determined has informed the reference stations, and its location is at or close to the perturbation. For systems that aid safety, machinery may be shut down, or vehicles slowed or stopped, and/or an alarm sounded if an area is entered, for example.

The embodiments described here are particularly suited to radar applications, since they do not require additional hardware to scan for single or multiple targets, unlike current instances in the state of the art of UWB. The embodiments also have significant advantages in their ability to separate and classify multiple targets due to the fine resolution of multipath reflection that they can determine in the presence of other signals or clutter. The embodiments may be combined with other positioning or timing systems such as GPS to provide greater coverage, availability and/or accuracy.

It will be appreciated that these embodiments of the invention of the invention are given by way of example only and modifications will be apparent to those skilled in the art.

The invention claimed is:

1. A method of producing an ultra-wideband signal comprising:

modulating a carrier signal by a spreading waveform which is a periodic deterministic wideband signal to generate a carrier frequency;

changing the carrier frequency by a predetermined amount at a predetermined interval to generate a predetermined amount of frequency change, wherein a reciprocal of the predetermined interval is a corresponding frequency hopping rate;

wherein there is a harmonic relationship between the carrier frequency configured to be transmitted, the predetermined amount of frequency change configured to be transmitted, and a period of the spreading waveform configured to be transmitted, so that a deterministic ultra-wideband signal having the harmonic relationship is configured to be transmitted.

2. A method according to claim 1, wherein the spreading waveform is a Pseudo Random Binary Sequence signal having a determined chipping rate, wherein a code length of the spreading waveform divided by the determined chipping rate is the period of the spreading waveform.

3. A method according to claim 1, wherein the spreading waveform is a chirp signal having a predetermined modulation rate and duration, wherein the period of the spreading waveform is the interval between a first chirp and a second chirp.

4. A method according to claim 1, further comprising frequency hopping in a pseudo-random manner.

5. A method according to claim 1, further comprising selecting the carrier frequency of each part of the ultra-wideband signal according to a pseudo-random algorithm.

6. A method according to claim 1, further comprising selecting a set of carrier frequencies to avoid the use of one or more frequencies or bands of frequencies within a selected bandwidth.

7. A method according to claim 1, further comprising applying power control to each individual frequency hop in order to control a signal-to-noise ratio of each hop or to reduce interference to third parties.

8. A method according to claim 1, further comprising weighing information received according to a function of a frequency on which the information is received.

9. A method according to claim 1, further comprising replacing information received on a frequency with information derived from information received on any of the frequencies prior to determining positional or time information.

10. A method according to claim 9, wherein the replaced information is an estimation of the information that would have been received if an environment experienced by the information passed from the transmitter and receiver was more favourable.

11. An apparatus for producing an ultra-wideband signal comprising:

a modulator configured to modulate a carrier signal by a spreading waveform which is a periodic deterministic wideband signal generating a carrier frequency; and a frequency changing device configured to change the carrier frequency by a predetermined amount at a predetermined interval to generate a predetermined amount of frequency change, wherein a reciprocal of the predetermined interval is a corresponding frequency hopping rate, wherein there is a harmonic relationship between the carrier frequency configured to be transmitted, the predetermined amount of frequency change configured to be transmitted, and a period of the spreading waveform configured to be transmitted, so that a deterministic ultra-wideband signal having the harmonic relationship is configured to be transmitted.

12. Apparatus according to claim 11, wherein the spreading waveform is a Pseudo Random Binary Sequence signal having a determined chipping rate, wherein a code length of the spreading waveform divided by the determined chipping rate is the period of the spreading waveform.

13. Apparatus according to claim 11, wherein the spreading waveform is a chirp signal having a predetermined modulation rate and duration, wherein the period of the spreading waveform is the interval between a first chirp and a second chirp.

14. Apparatus according to claim 11 wherein the frequency hopping device is configured to frequency hop in a pseudo-random manner.

15. Apparatus according to claim 14, wherein the frequency hopping device changes the carrier frequency to avoid the use of one or more frequencies or bands of frequencies within a selected bandwidth.

16. A transmitter including apparatus according to claim 11.

17. A positioning system including a plurality of reference stations, each reference station including a transmitter according to claim 16.

18. A positioning system according to claim 17 wherein the reference stations are part of a cellular telephone network.

19. A positioning system according to claim 17 or 18 including a mobile terminal which includes apparatus for receiving a signal comprising:
a demodulator configured to demodulate a deterministic ultra-wideband signal having a harmonic relationship between a transmitted carrier signal, a predetermined amount of transmitted frequency change, and a period of a transmitted spreading waveform, wherein the transmitted carrier signal is modulated by the transmitted spreading waveform which is a periodic deterministic wideband signal; and
a synchronizer configured to synchronize a local oscillator to match a frequency of the carrier which changes by a predetermined amount at predetermined interval to generate a predetermined amount of frequency change, wherein a reciprocal of the predetermined interval is the hopping rate; and
a frequency changing device configured to change a carrier frequency of the local oscillator to predetermined values.

20. A positioning system including a mobile terminal which includes a transmitter according to claim 16, the positioning system also including a plurality of reference stations which each include apparatus for receiving a signal comprising:
a demodulator configured to demodulate a deterministic ultra-wideband signal having a harmonic relationship between a transmitted carrier signal, a predetermined amount of transmitted frequency change, and a period of a transmitted spreading waveform, wherein the transmitted carrier signal is modulated by the transmitted spreading waveform which is a periodic deterministic wideband signal; and
a synchronizer configured to synchronize a local oscillator to match a frequency of the carrier which changes by a predetermined amount at predetermined interval to generate a predetermined amount of frequency change, wherein a reciprocal of the predetermined interval is the hopping rate; and
a frequency changing device configured to change a carrier frequency of the local oscillator to predetermined values.

21. Apparatus for receiving a signal comprising:
a demodulator configured to demodulate a deterministic ultra-wideband signal having a harmonic relationship between a transmitted carrier signal, a predetermined amount of transmitted frequency change, and a period of a transmitted spreading waveform, wherein the transmitted carrier signal is modulated by the transmitted spreading waveform which is a periodic deterministic wideband signal; and
a synchronizer configured to synchronize a local oscillator to match a frequency of the carrier which changes by a predetermined amount at a predetermined interval to generate a predetermined amount of frequency change, wherein a reciprocal of the predetermined interval is the hopping rate; and
a frequency changing device configured to change a carrier frequency of the local oscillator to predetermined values.

22. Apparatus according to claim 21, wherein the spreading waveform is a Pseudo Random Binary Sequence signal having a determined chipping rate, wherein a code length of the spreading waveform divided by the determined chipping rate is the period of the spreading waveform.

23. Apparatus according to claim 21, wherein the spreading waveform is a chirp signal having a predetermined modulation rate and duration, wherein the period of the spreading waveform is the interval between a first chirp and a second chirp.

24. An apparatus for producing deterministic ultra-wideband signal comprising:
modulating means for modulating a carrier signal by a spreading waveform which is a periodic deterministic wideband signal generating a carrier frequency; and
means for changing the carrier frequency by a predetermined amount at a predetermined interval to generate a predetermined amount of frequency change, wherein a reciprocal of the predetermined interval is a corresponding frequency hopping rate, wherein there is a harmonic relationship between the carrier frequency configured to be transmitted, the predetermined amount of frequency change configured to be transmitted, and a period of the spreading waveform configured to be transmitted, so that the deterministic ultra-wideband signal having the harmonic relationship is configured to be transmitted.

25. Apparatus for receiving a signal comprising:
a means for demodulating a deterministic ultra-wideband signal having a harmonic relationship between a transmitted carrier signal, a predetermined amount of transmitted frequency change, and a period of a transmitted spreading waveform, wherein the transmitted carrier signal is modulated by the transmitted spreading waveform which is a periodic deterministic wideband signal; and
a means for synchronising a local oscillator to match a frequency of the carrier which changes by a predetermined amount at a predetermined interval to generate a predetermined amount of frequency change, wherein a reciprocal of the predetermined interval is the hopping rate; and
means for changing a carrier frequency of the local oscillator to predetermined values.

* * * * *